United States Patent
Okamoto et al.

(10) Patent No.: US 12,212,203 B2
(45) Date of Patent: Jan. 28, 2025

(54) STATOR OF ROTATING ELECTRICAL MACHINE, INSULATING MEMBER FOR ROTATING ELECTRICAL MACHINE, AND ROTATING ELECTRICAL MACHINE

(71) Applicant: Hitachi Astemo, Ltd., Hitachinaka (JP)

(72) Inventors: Hiromitsu Okamoto, Ibaraki (JP); Yoshio Ozeki, Ibaraki (JP); Kenichi Nakayama, Ibaraki (JP); Satoshi Yamamura, Ibaraki (JP); Zhi Jing, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 223 days.

(21) Appl. No.: 17/790,366

(22) PCT Filed: Dec. 11, 2020

(86) PCT No.: PCT/JP2020/046237
§ 371 (c)(1),
(2) Date: Jun. 30, 2022

(87) PCT Pub. No.: WO2021/140830
PCT Pub. Date: Jul. 15, 2021

(65) Prior Publication Data
US 2023/0045248 A1  Feb. 9, 2023

(30) Foreign Application Priority Data

Jan. 8, 2020  (JP) .................................. 2020-001222

(51) Int. Cl.
*H02K 3/34* (2006.01)
*H02K 1/16* (2006.01)
(Continued)

(52) U.S. Cl.
CPC ............... *H02K 3/345* (2013.01); *H02K 1/16* (2013.01); *H02K 3/12* (2013.01); *H02K 21/14* (2013.01)

(58) Field of Classification Search
CPC ............ H02K 3/34; H02K 3/345; H02K 1/16; H02K 3/12; H02K 21/14
See application file for complete search history.

(56) References Cited

U.S. PATENT DOCUMENTS 4,788,761 A * 12/1988 Crawford ............... H02K 15/10
427/116
4,922,165 A * 5/1990 Crawford ............... H02K 15/12
310/216.015
(Continued)

FOREIGN PATENT DOCUMENTS

| JP | 10-159730 A | 6/1998 |
|---|---|---|
| JP | 2010-259316 A | 11/2010 |

(Continued)

OTHER PUBLICATIONS

JP-2018117402-A, Inoue, all pages (Year: 2018).*
(Continued)

*Primary Examiner* — Naishadh N Desai
(74) *Attorney, Agent, or Firm* — Foley & Lardner LLP (57) ABSTRACT

Reliability of a rotating electrical machine is enhanced. A stator of a rotating electrical machine includes: a stator core being provided with teeth and slots on a cylindrical inner side surface of the stator core; a plurality of winding wires being each arranged inside each of the slots; and slot liners being each arranged respectively between an inner wall of each of the slots and each of the plurality of winding wires, each of the slot liners has a sheet-like first insulating substrate, a second insulating material layer being disposed on at least one surface of each of the slot liners, and an adhesive layer which expands between the first insulating (Continued)

substrate and the second insulating material layer by processing, the second insulating material layer is provided with a through-hole which communicates a side of the first insulating substrate with the inner wall of each of the slots, and each of the slot liners is disposed inside each of the slots in such a way that the second insulating material layer is provided on a side closer to the inner wall of each of the slots than the first insulating substrate.

8 Claims, 8 Drawing Sheets

(51) Int. Cl.
  *H02K 3/12* (2006.01)
  *H02K 21/14* (2006.01)

(56) References Cited

U.S. PATENT DOCUMENTS

| | | | | |
|---|---|---|---|---|
| 5,175,396 | A * | 12/1992 | Emery | H02K 3/40 |
| | | | | 174/DIG. 27 |
| 11,909,286 | B2 * | 2/2024 | Schulz | H02K 15/105 |
| 2008/0106157 | A1 * | 5/2008 | Higashimura | H01B 1/24 |
| | | | | 310/214 |
| 2008/0231136 | A1 * | 9/2008 | Obata | H02K 3/38 |
| | | | | 310/179 |
| 2009/0195108 | A1 * | 8/2009 | Rippel | H02K 3/48 |
| | | | | 310/58 |
| 2010/0244615 | A1 * | 9/2010 | Kouda | H02K 3/48 |
| | | | | 310/215 |
| 2013/0300248 | A1 * | 11/2013 | Ishida | H02K 15/10 |
| | | | | 310/214 |
| 2015/0042198 | A1 * | 2/2015 | Brockschmidt | H01B 3/08 |
| | | | | 174/120 C |
| 2015/0311761 | A1 * | 10/2015 | Hattori | H01B 3/52 |
| | | | | 310/215 |
| 2020/0177057 | A1 * | 6/2020 | Uryu | H02K 1/16 |

FOREIGN PATENT DOCUMENTS

| | | |
|---|---|---|
| JP | 2013-009499 A | 1/2013 |
| JP | 2013-236468 A | 11/2013 |
| JP | 2018117402 A * | 7/2018 |

OTHER PUBLICATIONS

International Search Report with English translation and Written Opinion issued in corresponding application No. PCT/JP2020/046237, dated Mar. 30, 2021.

* cited by examiner

SEGMENT COIL INSERTION DIRECTION

STATOR OF ROTATING ELECTRICAL MACHINE, INSULATING MEMBER FOR ROTATING ELECTRICAL MACHINE, AND ROTATING ELECTRICAL MACHINE

TECHNICAL FIELD

The present invention relates to a stator of a rotating electrical machine and, in particular, relates to an insulating member for a rotating electrical machine.

BACKGROUND ART

Conventionally, inside each of slots of a stator of a rotating electrical machine, an insulating sheet referred to as a slot liner is disposed in such a way as to cover a coil, the slot liner is provided with an adhesive material layer, and the coil is firmly fixed and is insulated by expansion of an adhesive.

As a background art of the present technical field, there is JP 2013-9499 A (PTL 1).

Described in JP 2013-9499 A is "An insulating member for a rotary electric machine including a sheet-like insulating base material and an adhesive material layer provided on one surface or inside of the insulating base material, wherein the adhesive material layer is carried on the insulating base material in a state that it does not appear on one surface of the insulating member" (refer to claim 1).

CITATION LIST

Patent Literature

PTL 1: JP 2013-9499 A

SUMMARY OF INVENTION

Technical Problem

In a case of the above-described insulating sheet, there may be a case where upon inserting the insulating sheet into each of the slots, friction of the adhesion layer with a stator core is caused or upon inserting a coil conductor into the insulating sheet, friction of the adhesion layer with the coil conductor is caused, thereby peeling the adhesion layer and reducing fixing strength of an adhesive. In addition, it is likely that the peeled adhesive adheres to the stator core, thereby hindering assembly of a rotor and a housing and causing hinderance of operation of the rotating electrical machine.

Solution to Problem

One representative example of the invention disclosed in the present application is shown as follows. Specifically, a stator of a rotating electrical machine includes: a stator core being provided with teeth and slots on a cylindrical inner side surface of the stator core; a plurality of winding wires being each arranged inside each of the slots; and slot liners being each arranged respectively between an inner wall of each of the slots and each of the plurality of winding wires, each of the slot liners has a sheet-like first insulating substrate, a second insulating material layer being disposed on at least one surface of each of the slot liners, and an adhesive layer which expands between the first insulating substrate and the second insulating material layer by processing, the second insulating material layer is provided with a through-hole which communicates with a side of the first insulating substrate and the inner wall of each of the slots, and each of the slot liners is disposed inside each of the slots in such a way that the second insulating material layer is provided on a side closer to the inner wall of each of the slots than the first insulating substrate.

Advantageous Effects of Invention

According to one aspect of the present invention, damage of an adhesive layer upon assembling a rotating electrical machine can be inhibited. Problems, configurations, and effects other than those described above will be made clear by the below description of an embodiment.

DESCRIPTION OF EMBODIMENT

Figure 1:
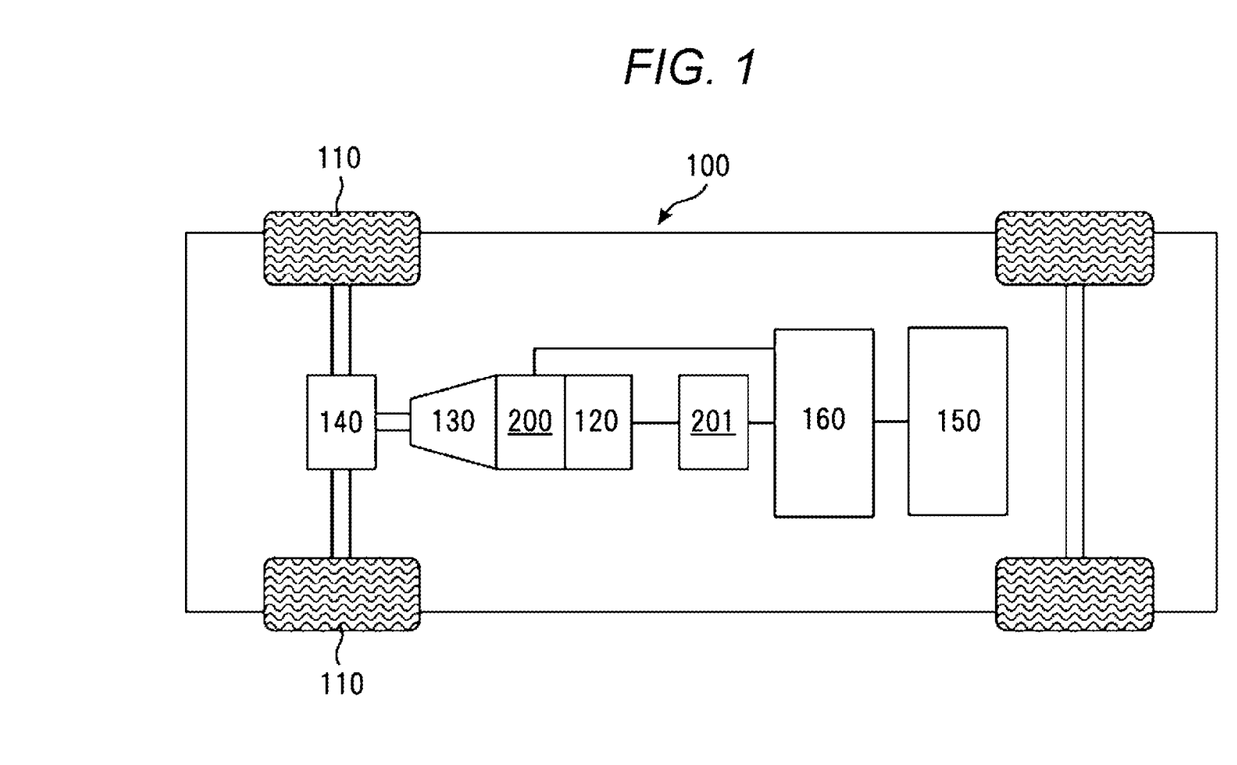
FIG. 1 is a schematic configuration diagram of a hybrid electric vehicle on which a rotating electrical machine according to an embodiment of the present invention is mounted.

As shown in FIG. 1, a vehicle 100 of a hybrid vehicle has mounted thereon an engine 120, a first rotating electrical machine 200, a second rotating electrical machine 201, and a high-voltage battery 150. The battery 150 is constituted of a secondary battery such as a lithium-ion battery or a nickel-hydrogen battery and outputs direct-current power of 250 volts to 600 volts or more. In a case where driving force by the rotating electrical machines 200 and 201 is needed, the battery 150 supplies direct-current power to the rotating electrical machines 200 and 201, and during regenerative traveling, the direct-current power is supplied from the rotating electrical machines 200 and 201. The direct-current power between the battery 150 and the rotating electrical machines 200 and 201 is given and received via a power converter 160.

In addition, in the vehicle 100, an auxiliary battery which supplies low voltage power (for example, 14-volt system power) is mounted, though the auxiliary battery is not shown. Rotation torque by the engine 120 and the rotating electrical machines 200 and 201 is transmitted via a transmission 130 and a differential gear 140 to front wheels 110. The rotating electrical machines 200 and 201 are configured to be substantially the same as each other, and hereinafter, the rotating electrical machine 200 will be described as a representative.

Figure 2:
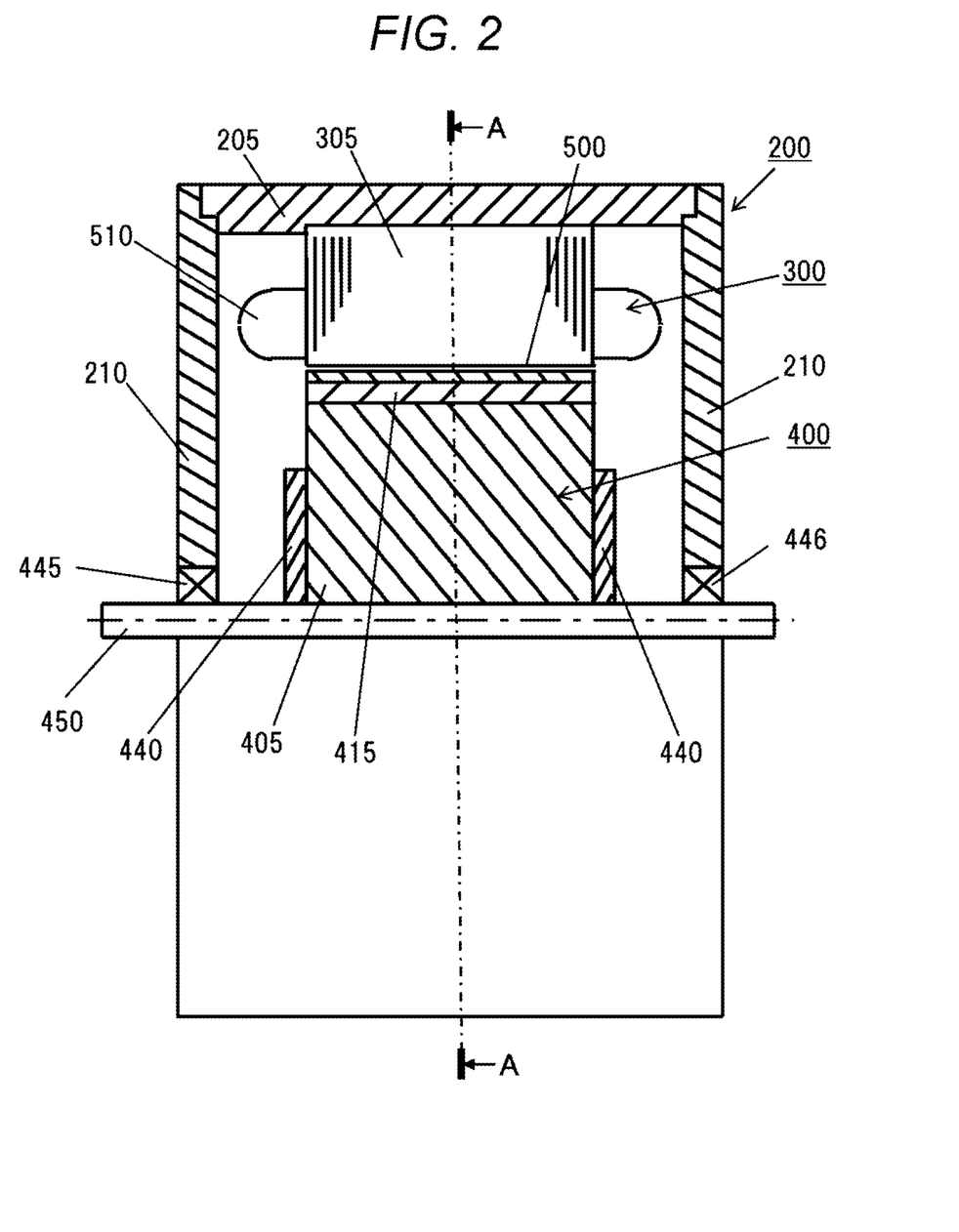
FIG. 2 is a schematic view showing the whole configuration of the rotating electrical machine.

FIG. 2 is a schematic view showing the whole configuration of the rotating electrical machine 200.

In FIG. 2, one part of the rotating electrical machine 200 is shown in a cross-sectional view, thereby showing an inside of the rotating electrical machine 200. As shown in FIG. 2, inside a housing 205, a stator 300 is supported, and the stator 300 has a stator core 305 and a stator coil 510. On an inner peripheral side of the stator core 305, a rotor 400 is rotatably supported via a gap 500.

The rotor 400 has a rotor core 405 fixed to a shaft 430, permanent magnets 415, and a non-magnetic end plate 420. The housing 205 has a pair of end brackets 210 for which bearings 425 and 426 are provided, and the shaft 430 is rotatably supported by the bearings 425 and 426.

This rotating electrical machine 200 is a permanent magnet built-in type three-phase synchronous motor. By supplying a three-phase alternating current to the stator coil 510 which is wound around the stator core 305, the rotating electrical machine 200 operates as an electric motor which rotates the rotor 400. In addition, when the rotating electrical machine 200 is driven by the engine 120, the rotating electrical machine 200 operates as a generator and outputs three-phase alternating current generated power. In other words, the rotating electrical machine 200 has both of a function as the electric motor which generates the rotation torque by using electric energy and a function as the generator which generates power by using mechanical energy and can selectively utilizes each of the above-mentioned functions depending on a traveling state of the vehicle.

Figure 3:
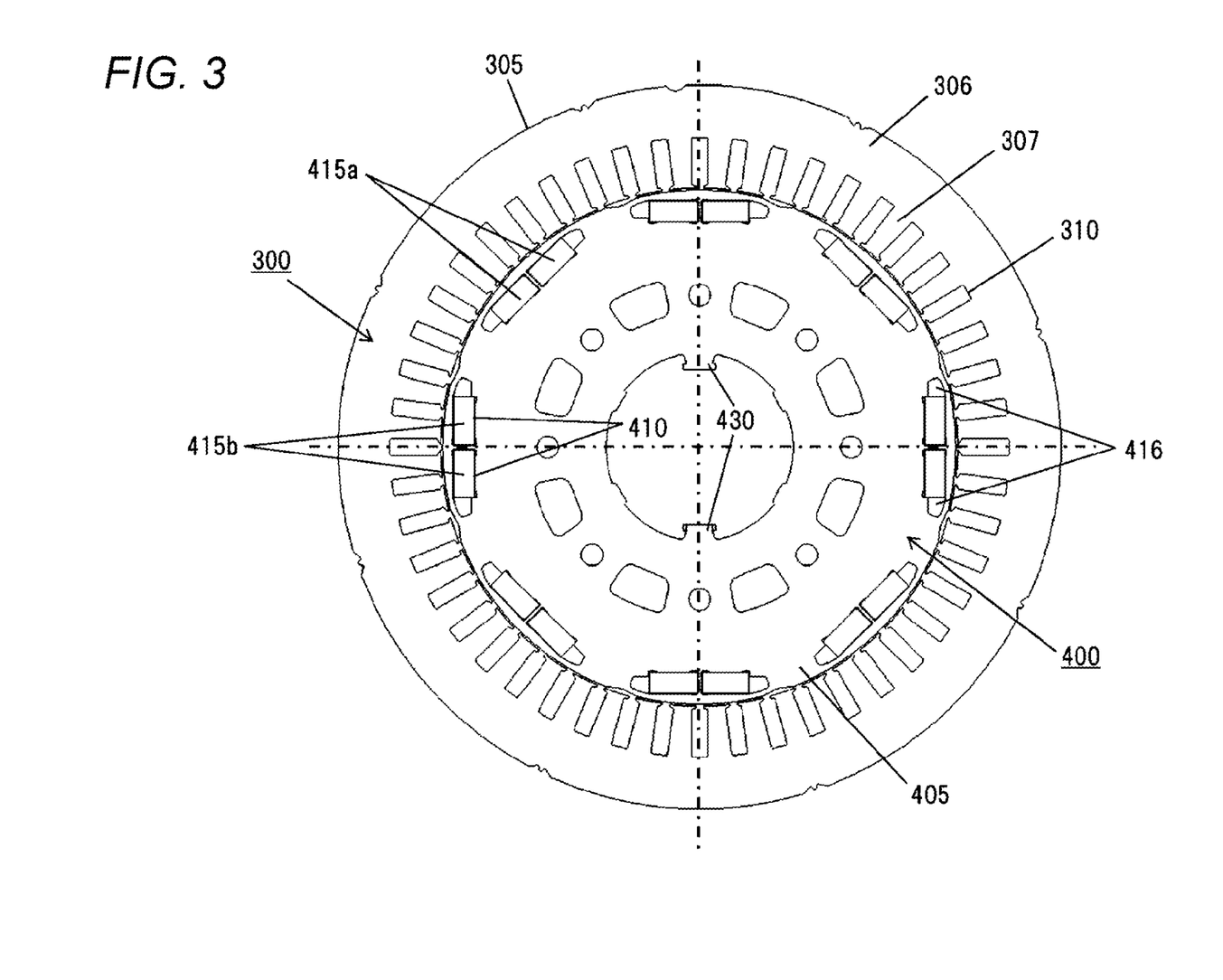
FIG. 3 is a cross-sectional view of the rotating electrical machine, taken along line A-A shown in FIG. 2.
Figure 4:
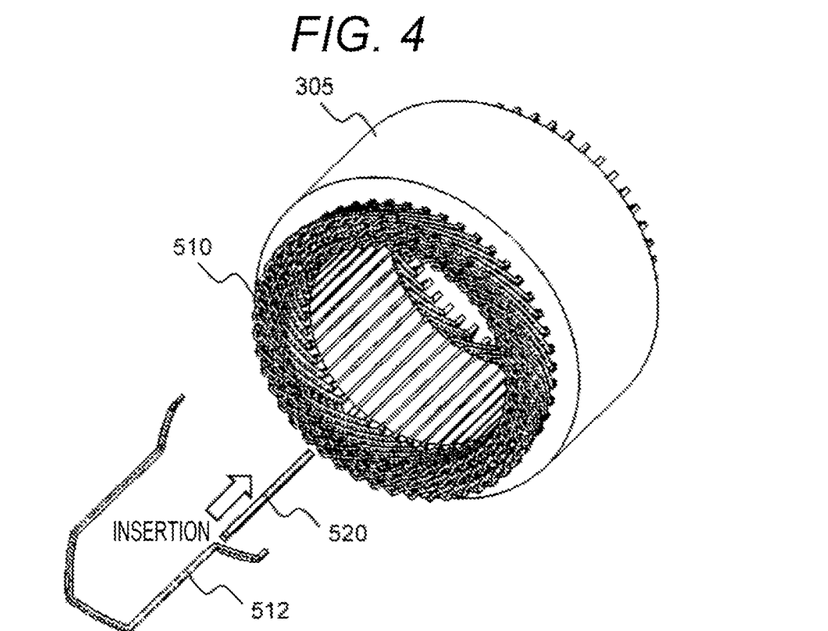
FIG. 4 is a perspective view showing a stator core to which a coil is attached.
Figure 5:
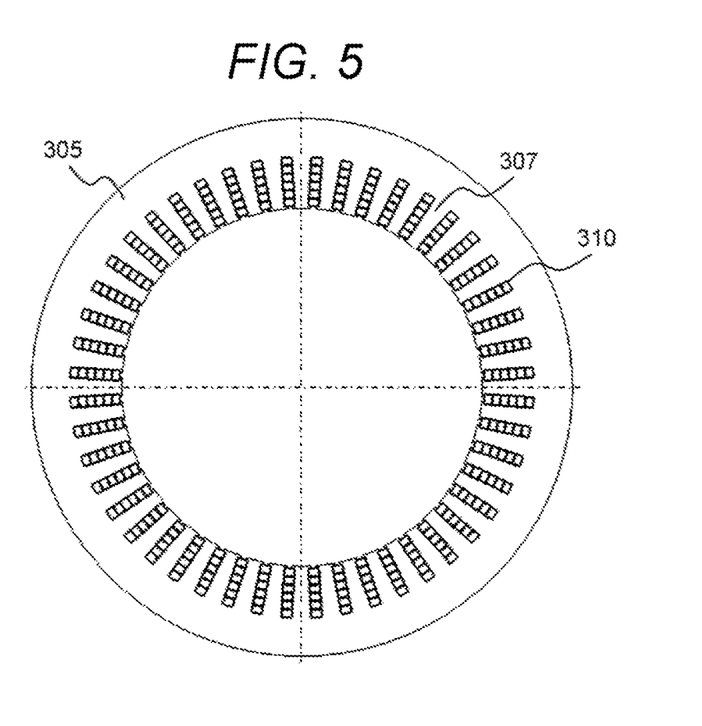
FIG. 5 is a plan view in which the stator core having the coil attached thereto is viewed from a coil end side.

FIG. 3 is a schematic view showing a cross-sectional view of the stator 300 and the rotor 400, taken along line A-A shown in FIG. 2 and showing a cross-sectional view, taken along line A-A shown in FIG. 2. FIG. 4 is a perspective view showing the stator core 305 with the coil attached and FIG. 5 is a plan view in which the stator core 305 with the coil attached is viewed from a coil end side. Note that in FIG. 3, the housing 205 and the shaft 430 are not shown.

The stator core 305 is formed by laminating a plurality of magnetic bodies (for example, a plurality of magnetic steel sheets) in an axial direction and is constituted of a yoke part and tooth parts (also referred to as projecting parts or salient-pole parts). The yoke part is constituted of a cylindrical yoke core 306 (also referred to as a core back) which is fitted to an inner peripheral side of the housing 205. The tooth parts are constituted of a plurality of tooth cores 307 which project from inner peripheral sides of the yoke core 306 in radial directions and are arranged at predetermined intervals in a circumferential direction. In FIG. 3, all the teeth are not denoted by reference signs and only a part of the tooth cores 307 is denoted by a reference sign as a representative. Respectively neighboring tooth cores 307 are continuous in the circumferential direction and on a side of the rotor 400, a plurality of slots 310 are formed. As shown in FIG. 4, inside each of the slots 310, slot insulation by a slot liner 520 is provided, and winding wires of a plurality of phases such as a U-phase, a V-phase, and a W-phase which constitute the stator 300 are attached. In the present embodiment, the stator coil 510 is wound by distributed winding. The stator coil 510 is constituted of a plurality of segment coils 512.

On the other hand, the rotor core 405 is formed by laminating a plurality of magnetic bodies, for example, a plurality of magnetic steel sheets in an axial direction, in each of the magnetic steel sheets, a rectangular magnet insertion hole 410 into which a magnet is inserted is opened, and in the magnet insertion hole 410, each of the permanent magnets 415 is embedded and is fixed by an epoxy-based adhesive or the like. A width of the magnet insertion hole 410 in a circumferential direction is set to be larger than a width of each of the permanent magnets 415 in a circumferential direction, and on both sides of each of the permanent magnets 415, magnetic gaps 416 are formed. In these magnetic gaps 416, an adhesive may be embedded, or these magnetic gaps 416 may be solidified integrally with the permanent magnets 415 by molding resin. The permanent magnets 415 act as field poles of the rotor 400.

Magnetization directions of the permanent magnets 415 face in radial directions, and directions of the magnetization directions of the field poles are reversed. In other words, when side surfaces of the permanent magnets 415a on a side of the stator are magnetized to N-poles and surfaces thereof on a side of the shaft are magnetized to S-poles, side surfaces of the neighboring permanent magnets 415b on a side of the stator are magnetized to S-poles and surfaces thereof on a side of the shaft are magnetized to N-poles. These permanent magnets 415a and permanent magnets 415b are alternately arranged in a circumferential direction. The permanent magnets 415 may be embedded in the rotor core 405 after magnetization, or before the magnetization, the permanent magnets 415 are inserted into the rotor core 405 and thereafter, the permanent magnets 415 may be magnetized by giving a strong magnetic field thereto. The permanent magnets 415 after the magnetization are strong magnets, and when the magnets are magnetized before fixing the permanent magnets 415 to the rotor 400, a strong attracting force is caused between the rotor core 405 and the permanent magnets 415 upon fixing the permanent magnets 415 and this attracting force disturbs work. In addition, it is likely that due to the strong attracting force, dust such as iron powder adheres to the permanent magnets 415. Therefore, magnetizing after inserting the permanent magnets 415 into the rotor core 405 enhances productivity of the rotating electrical machine 200.

As each of the permanent magnets 415, a neodymium-based or samarium-based sintered magnet, a ferrite magnet, a neodymium-based bonded magnet, or the like can be used. A residual magnetic flux density of each of the permanent magnets 415 is approximately 0.4 to 1.3 T.

As shown in FIG. 4, the stator 300 of the rotating electrical machine 200 is constituted of the cylindrical stator core 305, and the stator coil 510 and the slot liners 520, which are inserted into the stator core 305.

In the slots 310 of the stator core 305, the stator coil 510 is housed. In an example shown in FIG. 4, each of the slots 310 is an open slot, and on an inner peripheral side of the stator core 305, an opening to which the stator coil 510 is attached is formed.

Inside each of the slots 310, the slot liner 520 is disposed. The slot liner 520 is, for example, an insulating sheet made of heat resistant resin and a thickness thereof is approximately 0.1 mm to 0.5 mm. In each of the slots 310, the slot liner 520 is provided, thereby enhancing dielectric strength voltage in the coil inserted into the slots 310 and dielectric strength voltage between the coil and an inner surface of each of the slots 310 and retaining necessary dielectric strength voltage even when an insulating film of the coil is deteriorated or damaged.

Figure 6:
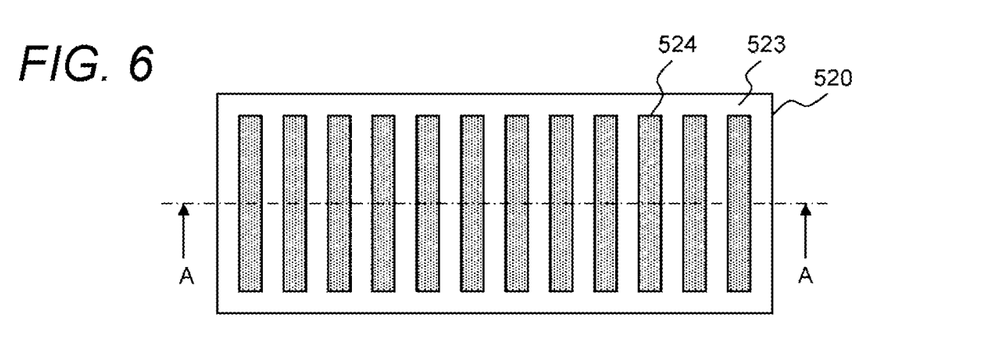
FIG. 6 is a development view of a sheet material constituting a slot liner.
Figure 7:
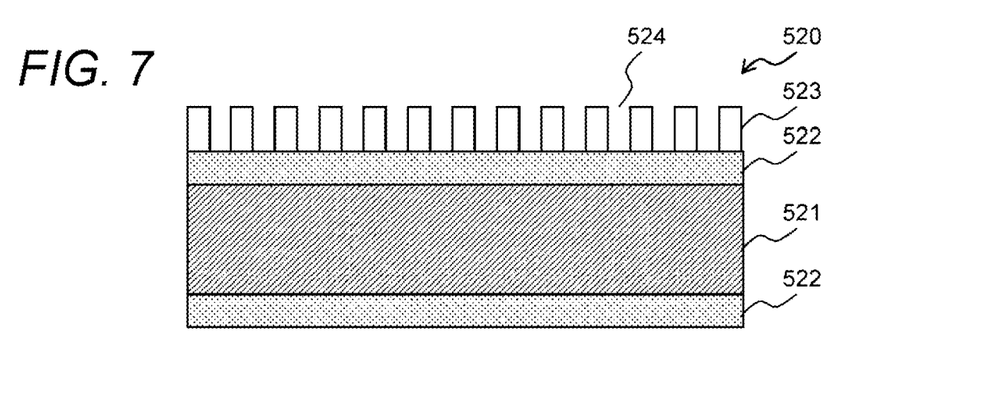
FIG. 7 is a cross-sectional view of the sheet material constituting the slot liner.

FIG. 6 is a development view of a sheet material constituting the slot liner 520 and FIG. 7 is a cross-sectional view constituting the slot liner 520.

In the present embodiment, used is the slot liner 520 in which on both surfaces of a first insulating substrate 521, adhesive layers 522 are formed and on one surface thereof, a second insulating material layer 523 is provided. The slot liner 520 is constituted of a sheet material in which on both surfaces of the first insulating substrate 521 made of a synthetic resin film (for example, highly heat resistant resin such as polyethylene naphthalate), adhesive layers 522 made of a foaming adhesive are formed. Furthermore, the first insulating substrate 521 may be subjected to flame-retardant processing. For example, on both surfaces of the first insulating substrate 521 made of a heat resistant resin film, flame-retardant resin layers (for example, aramid resin such as Nomex (Nomex is a registered trademark)) may be provided, and on the flame-retardant resin layers, the adhesive layers 522 may be provided. As the first insulating substrate 521, paper may be used, instead of the synthetic resin film.

By heating the foaming adhesive at a predetermined temperature for a predetermined period of time, the foaming resin expands and fills up gaps (clearances) between the stator coil 510 and inner walls of the slots 310, thereby fixing the stator coil 510 to the stator core 305. Note that an adhesive may be an adhesive whose volume increases by predetermined processing (for example, heating), instead of the foaming adhesive.

The second insulating material layer 523 may be formed by a synthetic resin film (for example, highly heat resistant resin such as polyethylene naphthalate), may be formed by a cloth-like sheet material made of synthetic resin fibers, or may be formed by applying synthetic resin onto the adhesive layers 522. The second insulating material layer 523 may be constituted of a material different from a material of the first insulating substrate 521 or may be constituted of a same material as the material of the first insulating substrate 521. For example, the first insulating substrate 521 may be formed by polyethylene naphthalate and the second insulating material layer 523 may be formed by Nomex. The second insulating material layer 523 is formed by Nomex, thereby allowing heat resistance and flame retardance of the slot liners 520 to be enhanced. In addition, the second insulating material layer 523 may be constituted of a material which is the same as the material of the first insulating substrate 521 (for example, polyethylene naphthalate). The second insulating material layer 523 is formed by polyethylene naphthalate, thereby allowing costs of the slot liners 520 to be reduced.

The second insulating material layer 523 is provided with through-holes 524 through which the expanded adhesive layers 522 can flow out. It is only required for one or more through-holes 524 to be provided, sizes thereof may be even or may be different from each other or one another, and shapes thereof may be various shapes such as a perfect circle, an ellipse, a square, and a rectangle. In other words, a number, a size, a shape of each of the through-holes 524 are not questioned, and representative examples of variation thereof will be described later with reference to FIGS. 10 to 17.

Figure 8:
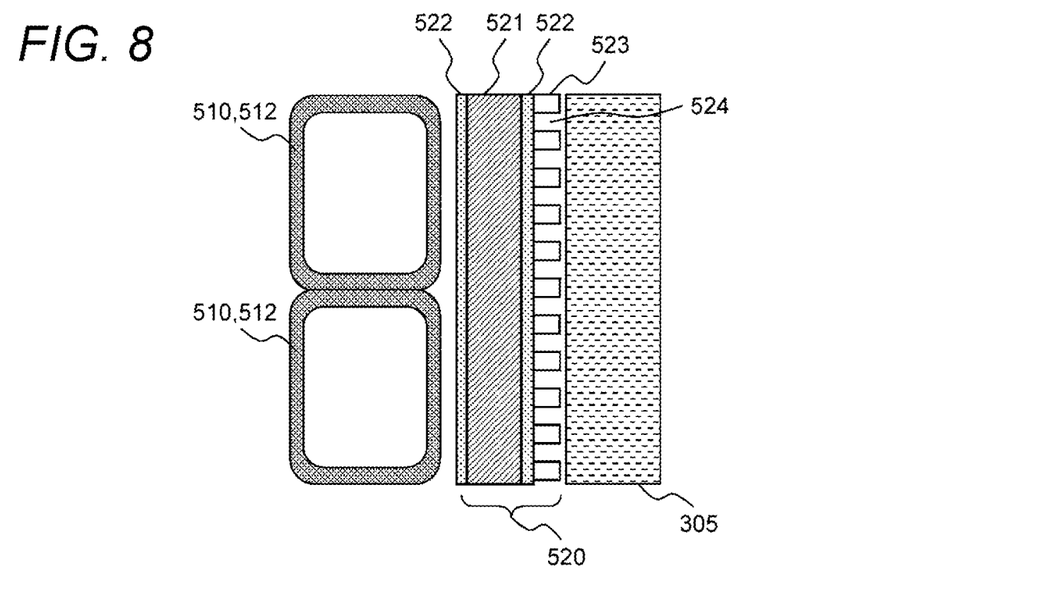
FIG. 8 is a diagram showing a slot liner and segment coils which are attached to the stator core.
Figure 9:
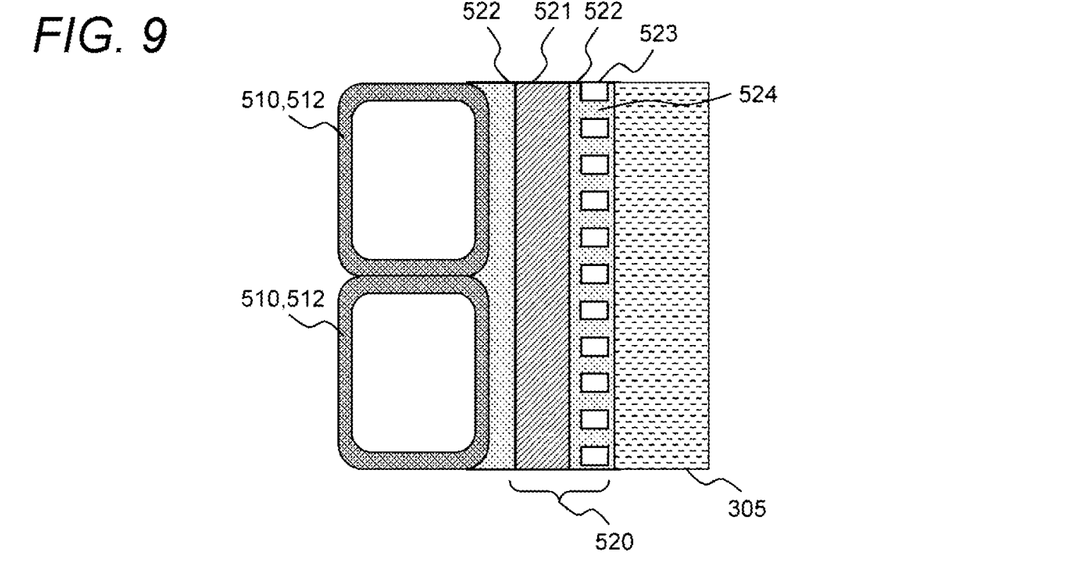
FIG. 9 is a diagram showing the slot liner and the segment coils, with an adhesive expanded.

FIG. 8 is a diagram showing the slot liner 520 and the segment coils 512, which are attached to the stator core 305, and FIG. 9 is a diagram showing the slot liner 520 and segment coils 512, with the adhesive expanded.

When the slot liners 520 are inserted into the slots 310, the slot liners 520 are arranged in such a way that the second insulating material layer 523 is located on an outer side close to inner walls of the slots 310. Since the second insulating material layer 523 is provided on at least one surface of each of the slot liners 520, no second insulating material layer 523 may be provided on an inner side which contacts the segment coils 512. The through-holes 524 provided for the second insulating material layer 523 are gaps which communicate the first insulating substrate 521 with the inner walls of the slots 310 and through which the expanded adhesive layers 522 can flow out.

When the stator core 305 is heated after the segment coils 512 have been inserted into the slot liners 520, the foaming adhesive of the adhesive layers 522 expands and flows through the through-holes 524 of the second insulating material layer 523 to outside the slot liners 520, and a space between the stator core 305 and the segment coils 512 is filled with the adhesive.

In the slot liner 520 shown in FIGS. 8 and 9, friction between the adhesive layers 522 and the stator core 305 is prevented by providing the second insulating material layer 523 on an outer side (a side opposite to the coil). However, the friction between the adhesive layers 522 and the segment coils 512 may be prevented by providing the second insulating material layer 523 on an inner side (a coil side), or the friction between the adhesive layers 522 and the stator core 305 and the friction between the adhesive layers 522 and the segment coils 512 may be prevented by providing the second insulating material layer 523 on both sides (the side opposite to the coil and the coil side).

For example, each of the slot liners 520 is formed by forming the adhesive layers 522 made of a 40 μm-thick foaming adhesive on the first insulating substrate 521 obtained by forming a 50 μm-thick Nomex layer on both surfaces of a 100 μm-thick polyethylene naphthalate synthetic resin film and by using a sheet material obtained by forming the second insulating material layer 523 made of a 50 μm-thick polyethylene naphthalate synthetic resin film. Since a thickness of the foaming adhesive expands approximately three times, in this example, a thickness of each of the slot liners 520 increases from 330 μm to 490 μm.

When the segment coils 512 and the slot liners 520 are located inside the slots 310, gaps are provided between the segment coils 512 and the stator core 305. Although when these gaps are made large, workability upon insertion is enhanced, a coil space factor is reduced and output characteristics of the rotating electrical machine 200 is thereby reduced. In addition, the gaps between the inner walls of the slots 310 and the stator coil 510 are filled with the foaming adhesive by the expansion of the adhesive layers 522 formed in the slot liners 520, thereby fixing the stator coil 510. If a gap is present between the stator core 305 and the stator coil 510, the stator coil 510 vibrates inside the stator core 305, thereby exerting influence on reliability of the rotating electrical machine 200. In addition, if the adhesive of the adhesive layers 522 is scarce with respect to the gaps, an expansion coefficient of the adhesive increases, thereby making fixation of the stator coil 510 insufficient.

As shown in FIG. 4, when the slot liners 520 are inserted into the slots 310, a surface of each of the slot liners 520 and an inner wall of each of the slots 310 contact each other. When on the surface of each of the slot liners 520, the adhesive layers 522 are exposed, the adhesive layers 522 may be shaved upon insertion into the slots 310. When the adhesive layers 522 become thin, the fixation of the stator coil 510 becomes insufficient and the stator coil 510 vibrates inside the stator core 305, thereby exerting influence on reliability of the rotating electrical machine 200. Therefore, for the slot liners 520 in the present embodiment, the second insulating material layer 523 which covers the adhesive layers 522 is provided. The adhesive layers 522 and the inner walls of the slots 310 are made not to be rubbed with each other by the second insulating material layer 523, thereby allowing peeling of the adhesive layers 522 caused by the friction on the surface of each of the slot liners 520 to be inhibited. Therefore, the gap between the stator coil 510 and the stator core 305 is filled with the expanded adhesive layers 522 at a desired expansion coefficient, thereby allowing vibration of the stator coil 510 due to a reduction in fixing strength of the adhesive to be inhibited and enabling reliability of the rotating electrical machine 200 to be enhanced. In addition, it is likely that the peeled adhesive turns into foreign matter and the foreign matter hinders assembly of the rotor 400 and the housing 205 in an assembly process of the rotating electrical machine 200 and causes hinderance of operation of the rotating electrical machine 200.

Next, with reference to FIGS. 10 to 17, a variety of variations of numbers, sizes, and shapes of the through-holes 524 will be described.

Figure 10:
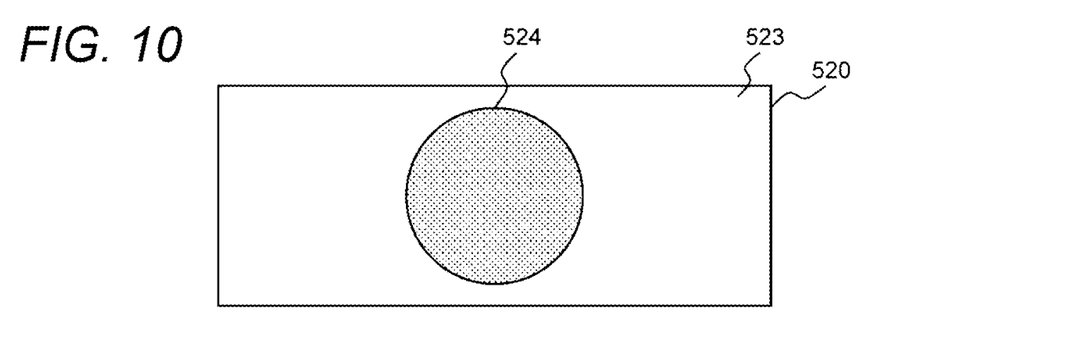
FIG. 10 is a diagram showing an example of arrangement of a through-hole of the slot liner.
Figure 11:
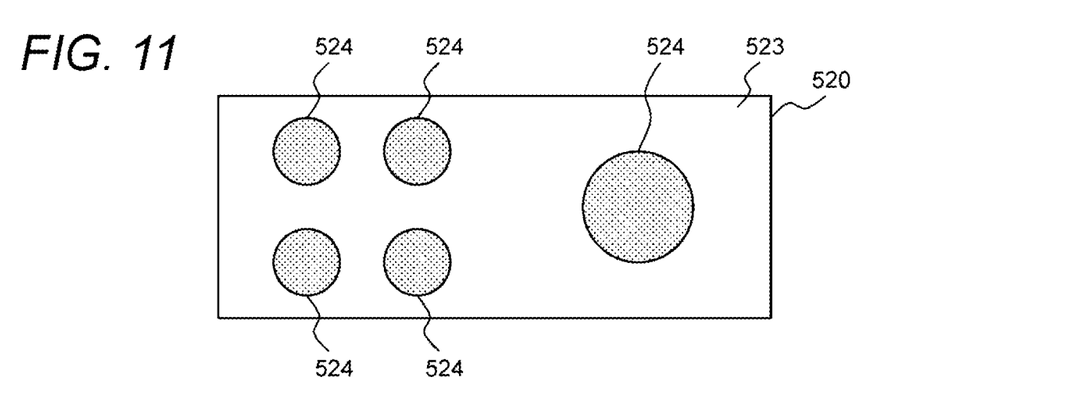
FIG. 11 is a diagram showing an example of arrangement of through-holes of the slot liner.
Figure 12:
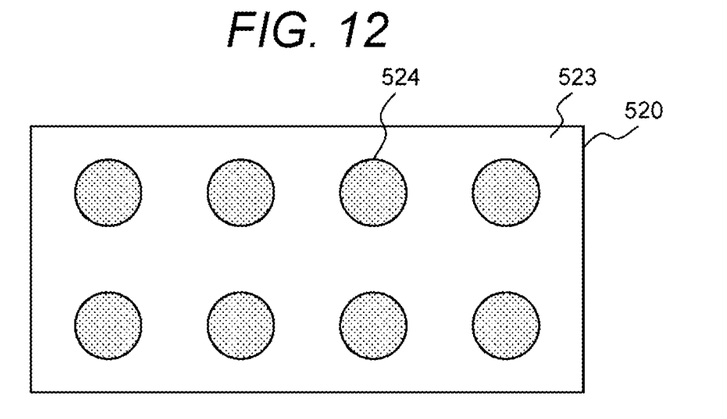
FIG. 12 is a diagram showing an example of arrangement of through-holes of the slot liner.
Figure 13:
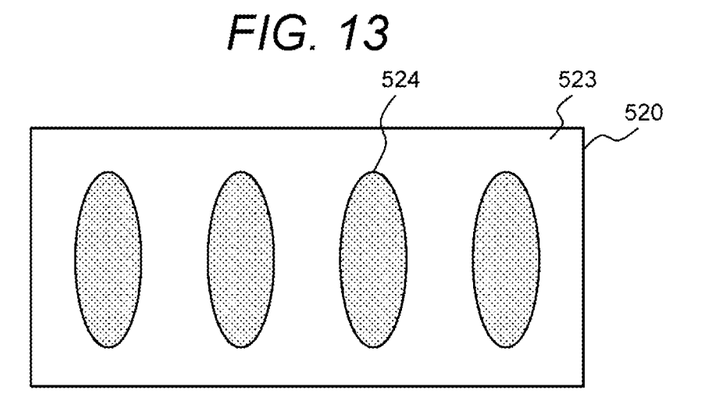
FIG. 13 is a diagram showing an example of arrangement of through-holes of the slot liner.
Figure 14:
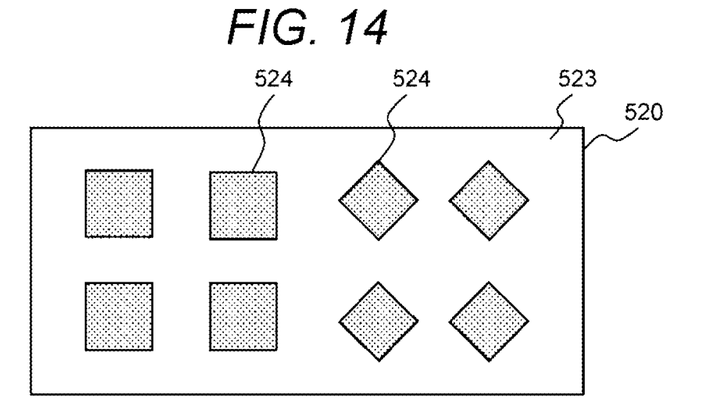
FIG. 14 is a diagram showing an example of arrangement of through-holes of the slot liner.

A through-hole 524 of the slot liner 520 shown in FIG. 10 is constituted of one perfect circle. In addition, through-holes 524 of the slot liner 520 shown in FIG. 11 are constituted of a large perfect circle and small perfect circles, a number of the large perfect circle and a number of the small perfect circles are different from each other, and in a configuration shown in FIG. 11, one large perfect circle and four small perfect circles are provided. In addition, through-holes 524 of the slot liner 520 shown in FIG. 12 are constituted of a plurality of small perfect circles, and in a configuration shown in FIG. 12, eight perfect circles are provided. Through-holes 524 of the slot liner 520 shown in FIG. 13 are constituted of a plurality of ellipses, and in a configuration shown in FIG. 13, four ellipses are provided. Through-holes 524 of the slot liner 520 shown in FIG. 14 are constituted of a plurality of squares whose directions and sizes are different from each other, and although in a configuration shown in FIG. 14, numbers and arrangement of different kinds of squares are the same as each other, the numbers and the arrangement may be different from each other.

Figure 15:
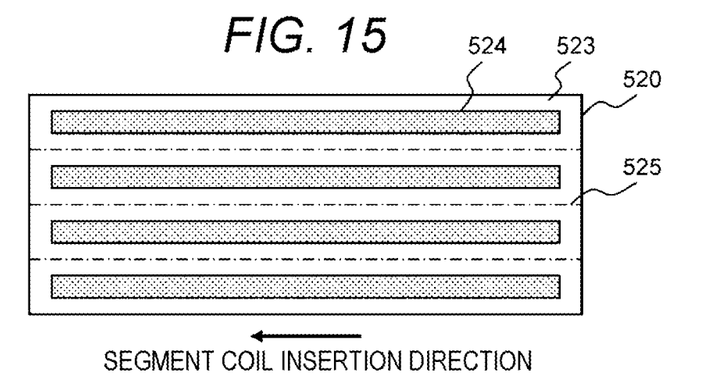
FIG. 15 is a diagram showing an example of arrangement of through-holes of the slot liner.

Each of the slot liners 520 is molded to be of a three-dimensional shape so as to allow each of the segment coils 512 to be inserted thereinto. Therefore, a planar insulating substrate is bent to form the three-dimensional shape. Through-holes 524 of the slot liner 520 shown in FIG. 15 are constituted of a plurality of rectangles, and a long side of each of the rectangles is provided in a direction of each of creases 525 of the slot liner 520 (preferably, in parallel with each of the creases 525). As described above, the through-holes 524 are formed by the rectangles, each of which is long in a direction of each of the creases 525 of the slot liner 520 (an insertion direction of each of the segment coils 512), thereby allowing strong adhesion force by the expanded adhesive layer 523 to be obtained.

Figure 16:
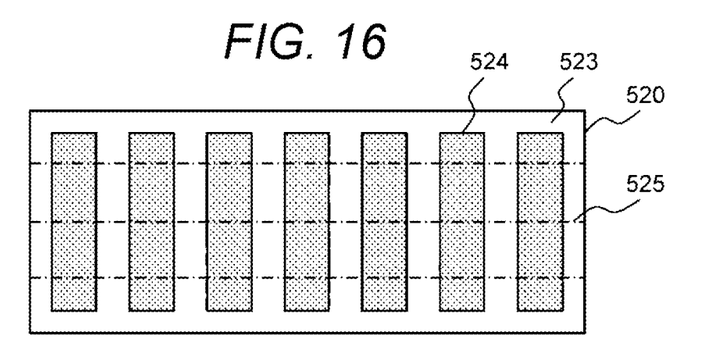
FIG. 16 is a diagram showing an example of arrangement of through-holes of the slot liner.

Through-holes 524 of the slot liner 520 shown in FIG. 16 are constituted of a plurality of rectangles, and a long side of each of the rectangles is provided in such a way as to intersect with each of creases 525 of the slot liner 520 (preferably, in such a way as to be perpendicular to each of the creases 525).

Figure 17:
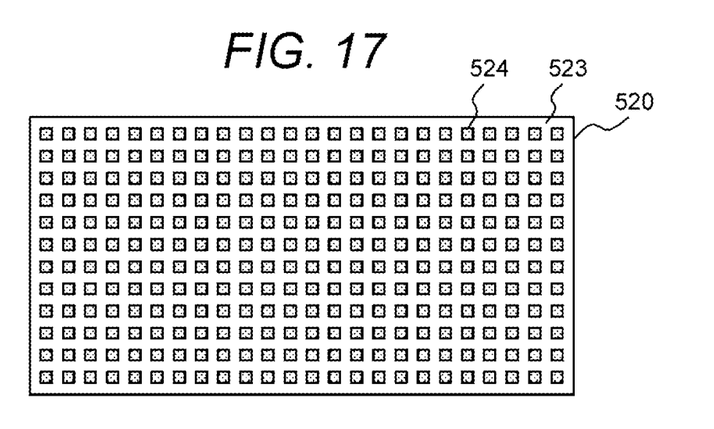
FIG. 17 is a diagram showing an example of arrangement of through-holes of the slot liner.

A second insulating material layer 523 of the slot liner 520 shown in FIG. 17 is formed by a fiber material, and through-holes 524 are gaps which are formed by fibers constituting the fiber material in a lattice-like or mesh-like manner.

As described above, the shape of each of the through-holes 524 may be any shape such as the perfect circle or perfect circles, the ellipses, the squares, and the rectangles shown in the drawings, and a plurality of shapes may be combined. In addition, a size of each of the through-holes 524 may be any size, and through-holes 524 having a plurality of sizes may be combined.

Note that the present invention is not limited to the above-described embodiment and various modifications and equivalent configurations coming within the meaning of the scope of the appended claims are embraced. For example, the above-described embodiment is described in details in order to facilitate understanding of the present invention, and the present invention is not necessarily limited to an embodiment which includes all the described configurations. In addition, a part of a configuration of a certain embodiment may be replaced with a configuration of other embodiment. In addition, a configuration of other embodiment may be added to a part of a configuration of a certain embodiment. In addition, as to a part of configurations of embodiments, addition, deletion, and replacement of other configurations may be made.

REFERENCE SIGNS LIST 100 vehicle
110 wheel
120 engine
130 transmission
140 differential gear
150 battery
160 power converter
200 rotating electrical machine
205 housing
210 end bracket
300 stator
305 stator core
306 yoke core
307 tooth core
310 slot
510 stator coil
512 segment coil
520 slot liner
521 first insulating substrate
522 adhesive layer
523 second insulating material layer

The invention claimed is:
1. A stator of a rotating electrical machine, the stator comprising:
a segment coil;
a stator core being provided with teeth and slots on a cylindrical inner side surface of the stator core;
a plurality of winding wires being each arranged inside each of the slots; and slot liners being each arranged respectively between an inner wall of each of the slots and each of the plurality of winding wires, wherein each of the slot liners has a sheet-like first insulating substrate, a second insulating material layer being disposed on at least one surface of each of the slot liners, and an adhesive layer which expands between the first insulating substrate and the second insulating material layer by processing, the second insulating material layer is provided with a through-hole which communicates a side of the first insulating substrate with the inner wall of each of the slots, each of the slot liners is disposed inside each of the slots in such a way that the second insulating material layer is provided on a side closer to the inner wall of each of the slots than the first insulating substrate, and the through-hole has a rectangle shape which has a first pair of sides and a second pair of sides that are longer than the first pair of sides and extend in an insertion direction of the segment coil, and the through-hole is formed not to overlap with creases that are formed upon molding each of the slot liners.

2. The stator of a rotating electrical machine according to claim 1, wherein the adhesive layer expands by the processing, flows out through the through-hole, and expands in such a way as to contact the inner wall of each of the slots.

3. The stator of a rotating electrical machine according to claim 1, wherein the second insulating material layer is constituted of an insulating material different from a material of the first insulating substrate.

4. The stator of a rotating electrical machine according to claim 1, wherein the second insulating material layer is constituted of a same insulating material as a material of the first insulating substrate.

5. The stator of a rotating electrical machine according to claim 1, wherein the second pair of sides of the through-hole extend in a direction in parallel with a crease that is formed upon molding each of the slot liners.

6. The stator of a rotating electrical machine according to claim 1, wherein the second insulating material layer is formed by a fiber material and the through-hole is formed by gaps of fibers constituting the fiber material.

7. An insulating member for a rotating electrical machine, the insulating member comprising:

a sheet-like first insulating substrate;

a second insulating material layer being disposed on at least one surface of the insulating member for the rotating electrical machine; and an adhesive layer which expands between the first insulating substrate and the second insulating material layer by processing, wherein the second insulating material layer is provided with a through-hole which communicates an inner wall of each of slots of a stator core of the rotating electrical machine with a side of the first insulating substrate, and the through-hole has a rectangle shape which has a first pair of sides and a second pair of sides that are longer than the first pair of sides and extend in an insertion direction of a segment coil of the rotating electrical machine, and the through-hole is formed not to overlap with creases that are formed upon molding the insulating member.

8. A rotating electrical machine having the stator of the rotating electrical machine according to claim 1.

* * * * *